US012643342B2

(12) United States Patent (10) Patent No.: US 12,643,342 B2

Matsumoto et al. (45) Date of Patent: Jun. 2, 2026

---

(54) WHEEL AND OMNIDIRECTIONAL MOVING DEVICE

(71) Applicant: Honda Motor Co., Ltd., Tokyo (JP)

(72) Inventors: Kanji Matsumoto, Saitama (JP); Yuji Ushijima, Saitama (JP); Wataru Yada, Saitama (JP); Ritsuya Oshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 754 days.

(21) Appl. No.: 17/960,138

(22) Filed: Oct. 5, 2022

(65) Prior Publication Data

US 2023/0166559 A1 Jun. 1, 2023

(30) Foreign Application Priority Data

Nov. 29, 2021 (JP) ................................. 2021-192897

(51) Int. Cl.
| | |
|---|---|
| *B60B 19/00* | (2006.01) |
| *B60B 19/12* | (2006.01) |
| *B60B 27/00* | (2006.01) |

(52) U.S. Cl.
CPC ............ *B60B 19/003* (2013.01); *B60B 19/12* (2013.01); *B60B 27/0015* (2013.01)

(58) Field of Classification Search
CPC ......... B60B 19/03; B60B 19/12; B60B 27/15; B60B 19/003; B60B 27/0015; B60L 50/52
See application file for complete search history.

(56) References Cited

U.S. PATENT DOCUMENTS

| | | | | |
|---|---|---|---|---|
| 7,552,977 | B2 * | 6/2009 | Lamprich | ............ A61G 5/1008 |
| | | | | 301/5.23 |
| 8,499,864 | B2 * | 8/2013 | Takenaka | ............. B62K 11/007 |
| | | | | 180/21 |

(Continued)

FOREIGN PATENT DOCUMENTS

| | | | | |
|---|---|---|---|---|
| CN | 105984274 A | * | 10/2016 | ............. B60B 19/12 |
| JP | 2006329400 A | * | 12/2006 | ............. F16J 15/109 |

(Continued)

OTHER PUBLICATIONS

"Office Action of Japan Counterpart Application", issued on May 7, 2024, with English translation thereof, p. 1-p. 8.

*Primary Examiner* — S. Joseph Morano
*Assistant Examiner* — Eva L Comino
(74) *Attorney, Agent, or Firm* — JCIPRNET

(57) ABSTRACT

A wheel for an omnidirectional moving device includes an annular core body formed by connecting joint members in an annular shape, and free rollers rotatably supported by the core body. Each of the joint members includes a shaft portion having a first end and a second end, a first connecting portion provided at the first end, and a second connecting portion provided at the second end. Each of the free rollers is rotatably supported by the shaft portion of the corresponding joint member. The first connecting portion of each of the joint members is rotatably connected to the second connecting portion of the adjacent joint member. The first end of each of the joint members abuts on the second end of the adjacent joint member so that a rotation range of the adjacent joint members is restricted. A cushioning material is provided between the first end and the second end.

16 Claims, 10 Drawing Sheets

(56)     References Cited

U.S. PATENT DOCUMENTS

| | | | | | |
|---|---|---|---|---|---|
| 8,827,375 | B2 * | 9/2014 | Takenaka | ................ | B62K 1/00 |
| | | | | | 301/5.23 |
| 9,919,557 | B2 * | 3/2018 | Yoshino | ............... | B62K 11/007 |
| 2010/0096905 | A1 * | 4/2010 | Takenaka | ................ | B62K 1/00 |
| | | | | | 301/5.1 |
| 2011/0067937 | A1 * | 3/2011 | Gomi | ................... | B62K 11/007 |
| | | | | | 180/21 |
| 2013/0133960 | A1 * | 5/2013 | Yada | .................... | B60B 19/003 |
| | | | | | 180/21 |
| 2016/0023511 | A1 * | 1/2016 | Liddiard | .............. | B60B 19/003 |
| | | | | | 301/5.23 |
| 2016/0303898 | A1 * | 10/2016 | Yoshino | ............... | B60B 19/003 |
| 2016/0304163 | A1 * | 10/2016 | Yoshino | ................... | B62K 1/00 |
| 2020/0062031 | A1 * | 2/2020 | Murai | .................. | B60B 19/003 |
| 2021/0262571 | A1 * | 8/2021 | Ono | ........................ | F16J 15/102 |

FOREIGN PATENT DOCUMENTS

| | | | | | | |
|---|---|---|---|---|---|---|
| JP | 2013107575 | A | * | 6/2013 | ........... | B60B 19/003 |
| JP | 5687174 | | | 3/2015 | | |
| JP | 2016203680 | | | 12/2016 | | |
| JP | 2016215960 | A | * | 12/2016 | ............ | B60B 19/12 |
| JP | 2018122849 | | | 8/2018 | | |
| JP | 2018122849 | A | * | 8/2018 | ............ | B60B 19/00 |
| JP | 2019182378 | A | * | 10/2019 | ............ | B60B 19/00 |
| WO | WO-2010064408 | A1 | * | 6/2010 | ........... | B60B 19/125 |

* cited by examiner

WHEEL AND OMNIDIRECTIONAL MOVING DEVICE

CROSS-REFERENCE TO RELATED APPLICATION

This application claims the priority benefits of Japanese application no. 2021-192897, filed on Nov. 29, 2021. The entirety of the above-mentioned patent application is hereby incorporated by reference herein and made a part of this specification.

BACKGROUND

Technical Field

The disclosure relates to a wheel and an omnidirectional moving device.

Description of Related Art

Patent Literature 1 (Specification of Japanese Patent No. 5687174) discloses an omnidirectional moving device which includes an annular wheel, a pair of drive disks, a plurality of drive rollers provided on each drive disk, and a pair of electric motors rotating each drive disk. The wheel has a plurality of joint members connected in series and in an annular shape, and a plurality of free rollers rotatably supported by each joint member. The joint members are connected to one another to be rotatable within a predetermined range. The joint members rotate with one another to bend the wheel so that a ground contact area of the free rollers can be increased.

As adjacent joint members rotate with each other and collide with each other, there is a problem that a collision sound is generated.

SUMMARY

An aspect of the disclosure provides a wheel (17) for an omnidirectional moving device (3). The wheel includes: an annular core body (36) formed by connecting a plurality of joint members (35) in an annular shape; and a plurality of free rollers (37) rotatably supported by the core body. Each of the joint members includes a shaft portion (41) having a first end (42) and a second end (46), a first connecting portion (43) provided at the first end, and a second connecting portion (47) provided at the second end. Each of the plurality of free rollers is rotatably supported by the shaft portion of the corresponding joint member. The first connecting portion of each of the joint members is rotatably connected to the second connecting portion of the adjacent joint member. The first end of each of the joint members abuts on the second end of the adjacent joint member so that a rotation range of the adjacent joint members is restricted. A cushioning material is provided between the first end and the second end.

Another aspect of the disclosure provides an omnidirectional moving device, including: the above-mentioned wheel; a pair of drive disks (16) rotatably supported by a frame (15), arranged on both sides of the wheel, and transmitting a driving force to the wheel; and a pair of electric motors (18) respectively rotating the drive disks.

DESCRIPTION OF THE EMBODIMENTS

Figure 1:
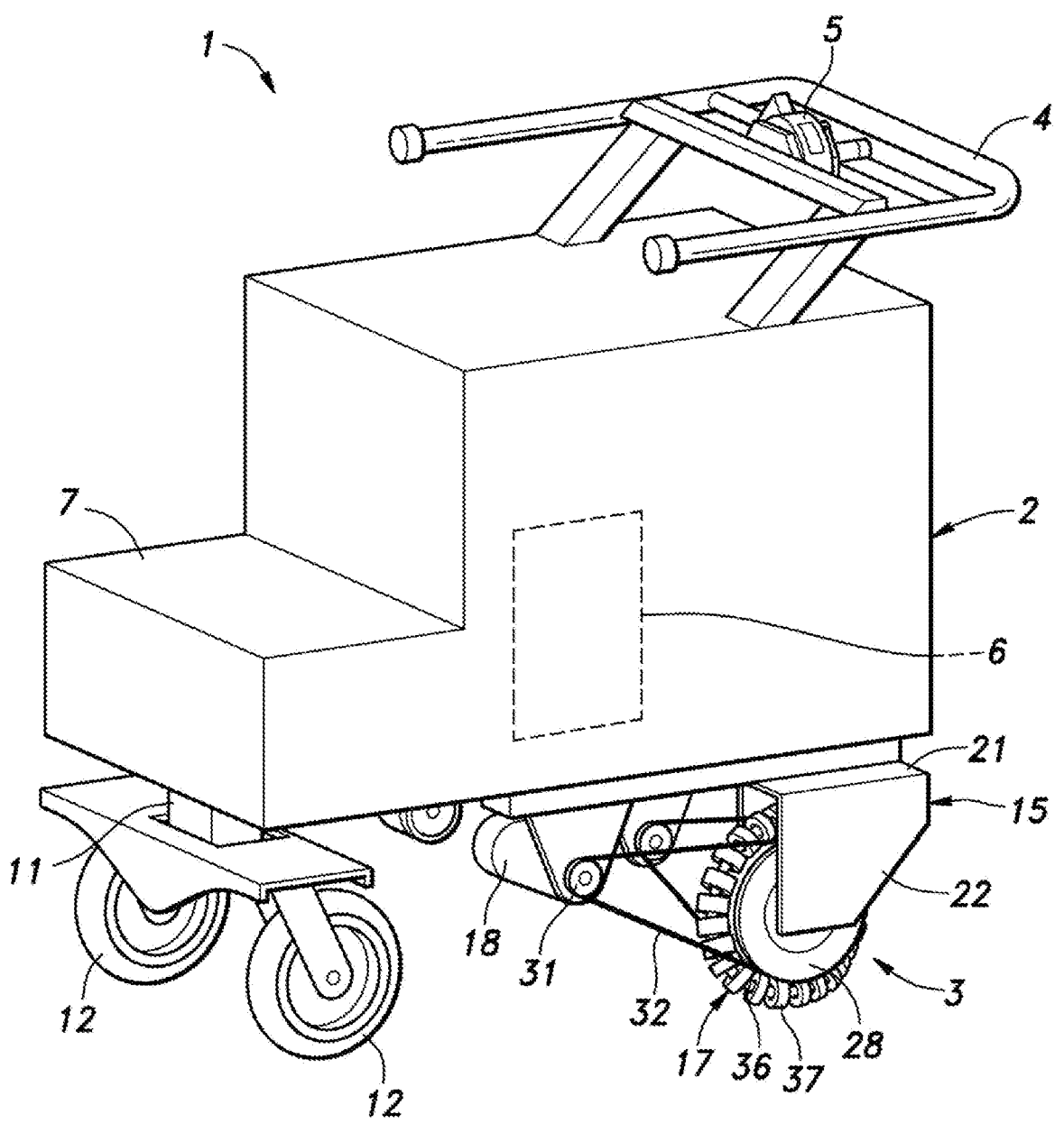
FIG. 1 is a perspective view of a cart provided with the omnidirectional moving device according to an embodiment.

The disclosure suppresses the collision sound of the joint members in the wheel and the omnidirectional moving device using the wheel.

An aspect of the disclosure provides a wheel (17) for an omnidirectional moving device (3). The wheel includes: an annular core body (36) formed by connecting a plurality of joint members (35) in an annular shape; and a plurality of free rollers (37) rotatably supported by the core body. Each of the joint members includes a shaft portion (41) having a first end (42) and a second end (46), a first connecting portion (43) provided at the first end, and a second connecting portion (47) provided at the second end. Each of the plurality of free rollers is rotatably supported by the shaft portion of the corresponding joint member. The first connecting portion of each of the joint members is rotatably connected to the second connecting portion of the adjacent joint member. The first end of each of the joint members abuts on the second end of the adjacent joint member so that a rotation range of the adjacent joint members is restricted. A cushioning material is provided between the first end and the second end.

According to this aspect, since the adjacent joint members collide with each other through the cushioning material, the collision sound can be suppressed.

In the above aspect, the shaft portion may have a first end surface (50) at the first end, the first connecting portion may protrude from the first end surface, the second connecting portion may be formed in a tubular shape, and the first connecting portion of each of the joint members may be inserted into the second connecting portion of the adjacent joint member, and may be rotatably connected to the second connecting portion by a connecting shaft body (49).

According to this aspect, the structure of the joint member can be simplified.

In the above aspect, the cushioning material may be formed in an annular shape, and may be arranged around the first connecting portion.

According to this aspect, the cushioning material can be prevented from falling off.

In the above aspect, a receiving groove (66) surrounding the first connecting portion may be provided on the first end surface, and the cushioning material may be arranged in the receiving groove.

According to this aspect, the position of the cushioning material can be stabilized.

In the above aspect, the cushioning material may protrude outward from the receiving groove.

According to this aspect, the cushioning material can be thickened to increase the cushioning effect.

In the above aspect, a main surface of the cushioning material may be arranged on the same plane as the first end surface.

According to this aspect, the gap between the first end and the second end of the adjacent joint members can be reduced. Accordingly, it is possible to prevent foreign matter from entering the gap between the first end and the second end of the adjacent joint members.

In the above aspect, a width of the receiving groove may be greater than a width of the cushioning material.

According to this aspect, the compressed cushioning material can be deformed in the receiving groove.

In the above aspect, a flange portion (73) extending the first end surface in a radial direction may be provided at the first end, the free roller may be supported by the shaft portion via a bearing (75), and the bearing may be fixed to the shaft portion by the flange portion and a snap ring (81) mounted on an outer peripheral surface of the shaft portion.

According to this aspect, the flange portion and the cushioning material can be brought close to each other, and the joint member can be formed compactly. Further, the cushioning material can be expanded in the radial direction of the shaft portion.

Another aspect of the disclosure provides an omnidirectional moving device, including: the above-mentioned wheel; a pair of drive disks (16) rotatably supported by a frame (15), arranged on both sides of the wheel, and transmitting a driving force to the wheel; and a pair of electric motors (18) respectively rotating the drive disks.

According to this aspect, in the omnidirectional moving device, the collision sound of the adjacent joint members can be suppressed.

According to the above configuration, it is possible to suppress the collision sound of the joint members in the wheel and the omnidirectional moving device using the wheel.

Hereinafter, embodiments of a wheel for an omnidirectional moving device and the omnidirectional moving device according to the disclosure will be described with reference to the drawings. The following description illustrates an example in which the omnidirectional moving device is applied to a cart.

As shown in FIG. 1, the cart 1 includes a vehicle body 2, a pair of omnidirectional moving devices 3 provided on the vehicle body 2 and moving the vehicle body 2 in all directions along a floor surface, a handle 4 provided on the vehicle body 2 and receiving an operation of a user, a force sensor 5 detecting a load applied to the handle 4, and a control device 6 controlling the omnidirectional moving device 3 based on the load detected by the force sensor 5.

A support base 7 for supporting another device is provided at the front part of the vehicle body 2. The device to be supported by the support base 7 includes, for example, an inspection device such as an X-ray scanner. The device may be fastened to the support base 7. The control device 6, a battery, and various sensors may be provided inside the rear part of the vehicle body 2.

Figure 2:
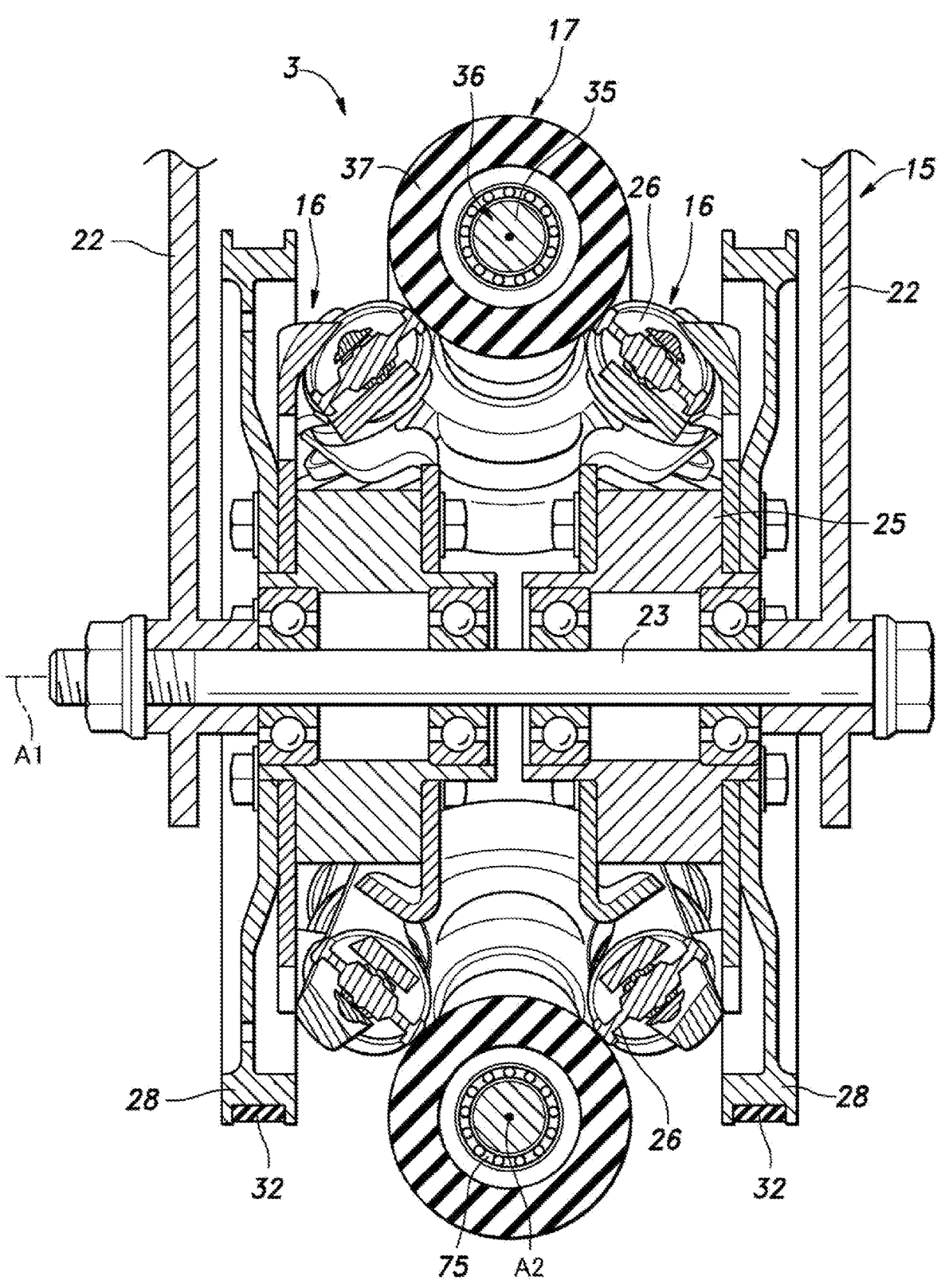
FIG. 2 is a cross-sectional view of the omnidirectional moving device.

The pair of omnidirectional moving devices 3 are provided at the lower part of the rear part of the vehicle body 2. Left and right casters 12 are supported at the lower part of the front part of the vehicle body 2 via a suspension 11. As shown in FIG. 1 and FIG. 2, each omnidirectional moving device 3 includes a frame 15, a pair of drive disks 16 rotatably supported by the frame 15, an annular wheel 17 arranged between the pair of drive disks 16, and a pair of electric motors 18 respectively rotating the drive disks 16. The pair of drive disks 16 transmit a driving force to the wheel 17.

As shown in FIG. 1, the frame 15 includes a frame upper portion 21 coupled to the lower part of the vehicle body 2, and a pair of frame side portions 22 extending downward from the left and right ends of the frame upper portion 21. As shown in FIG. 2, a support shaft 23 extending to the left and right is bridged to the lower ends of the pair of frame side portions 22. The pair of drive disks 16 are rotatably supported by the support shaft 23. The pair of drive disks 16 rotate around the axis of the support shaft 23. The position of each drive disk 16 in the left-right direction with respect to the support shaft 23 is restricted. The drive disks 16 face each other at a distance in the left-right direction.

The drive disks 16 are respectively arranged on both sides of the annular wheel 17, and apply a frictional force to the wheel 17 to rotate the wheel 17 around a central axis A1 and around an annular axis A2. The drive disk 16 includes a disk-shaped base 25 rotatably supported by the frame 15, and a plurality of drive rollers 26 which are rotatably supported by the outer peripheral portion of the base 25 to be inclined to one another and come into contact with the wheel 17. The base 25 is arranged coaxially with the support shaft 23.

Driven pulleys 28 are respectively provided on opposite surfaces of the drive disks 16. The driven pulley 28 is provided coaxially with the drive disk 16. As shown in FIG. 1, the pair of electric motors 18 respectively rotating the drive disks 16 are provided at the lower part of the vehicle body 2. A drive pulley 31 is provided on the drive shaft of each electric motor 18. The drive pulley 31 is connected to the corresponding driven pulley 28 via a belt 32. In the present embodiment, four electric motors 18 are provided corresponding to the four drive disks 16. As the electric motors 18 rotate independently of one another, the drive disks 16 rotate independently of one another.

Figure 3:
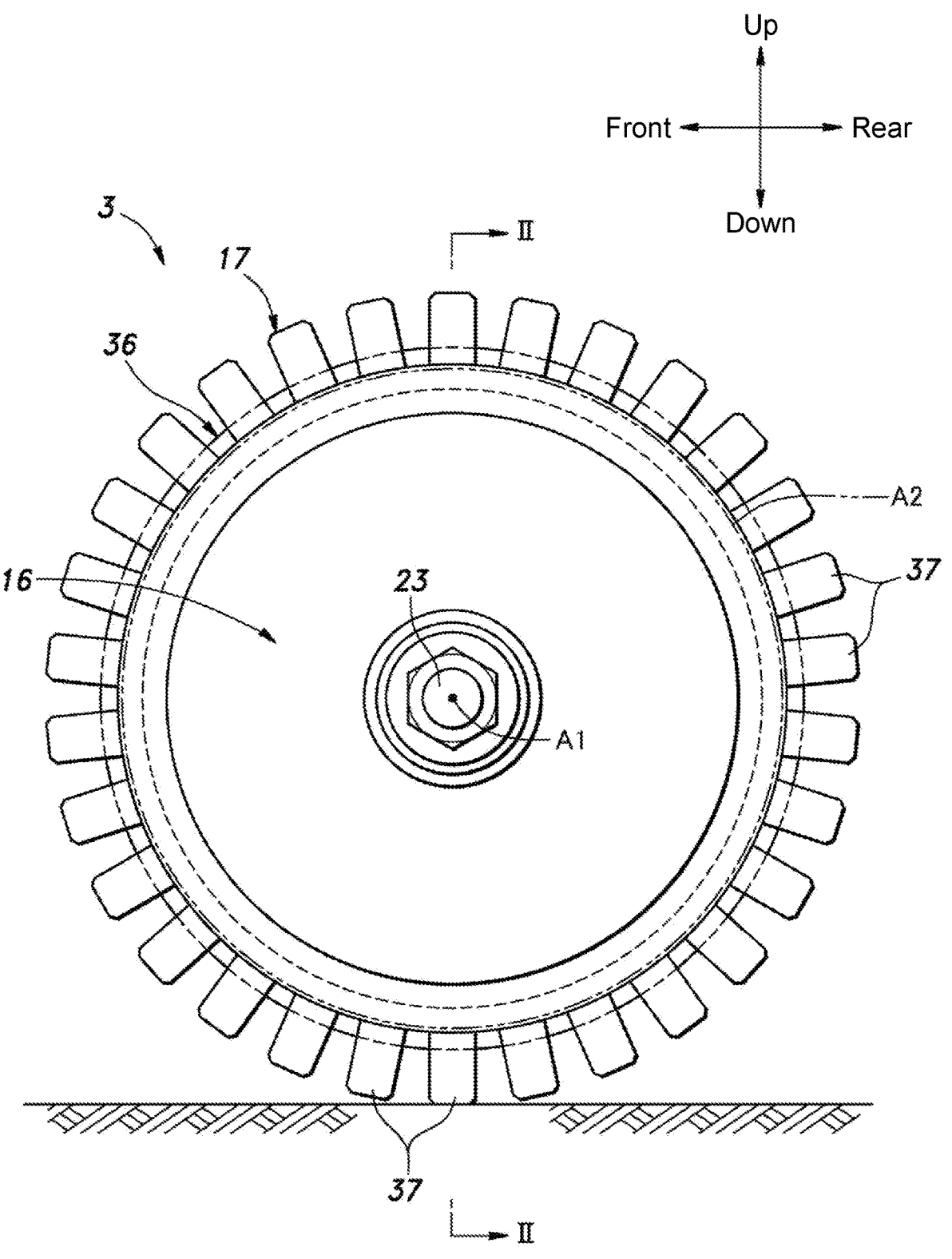
FIG. 3 is a side view of the omnidirectional moving device.
Figure 4:
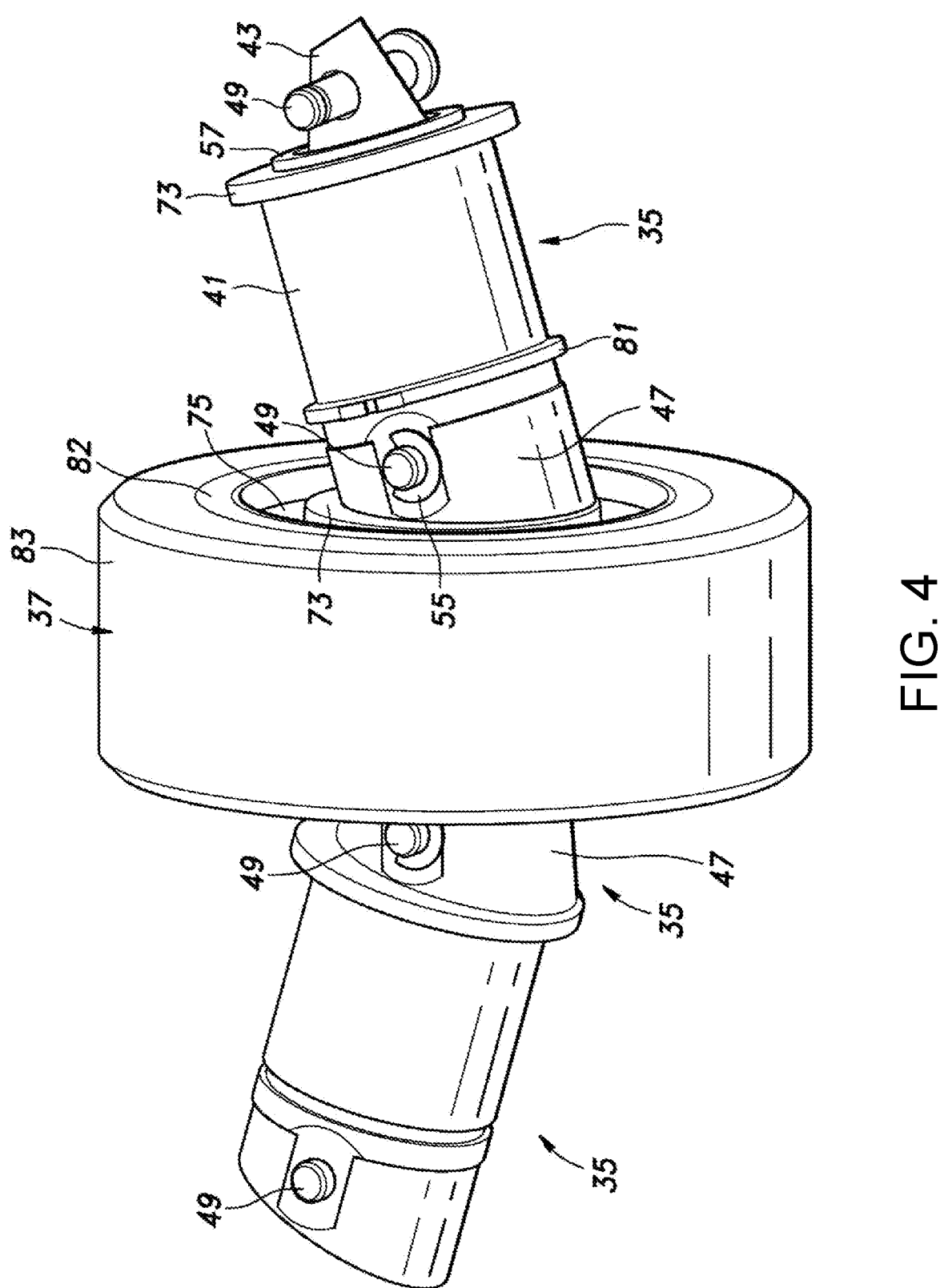
FIG. 4 is a perspective view showing the joint member and the free roller according to the first embodiment.

As shown in FIG. 2 and FIG. 3, the wheel 17 forms an annular shape, is arranged coaxially with the drive disks 16 between the pair of drive disks 16, is in contact with the plurality of drive rollers 26, and is rotatable around the central axis A1 and around the annular axis A2. As shown in FIG. 2 to FIG. 4, the wheel 17 includes an annular core body 36 formed by connecting a plurality of joint members 35 in an annular shape, and a plurality of free rollers 37 rotatably supported by the core body 36.

As shown in FIG. 5 to FIG. 8, each of the joint members 35 includes a shaft portion 41 having a first end 42 and a second end 46, a first connecting portion 43 provided at the first end 42, and a second connecting portion 47 provided at the second end 46. The shaft portion 41 is formed in a columnar shape and has the first end 42 and the second end 46 in the direction of the axis A3. The shaft portion 41 has a first end surface 50 at the first end 42. The first end surface 50 may be a flat surface substantially orthogonal to the axis A3 of the shaft portion 41. The joint member 35 may be formed of metal or resin.

The first connecting portion 43 is a protrusion protruding from the first end surface 50. The first connecting portion 43 may be formed in a conical shape. The first connecting portion 43 protrudes along the axis A3 of the shaft portion 41. The width of the first connecting portion 43 is narrowed toward the tip end side.

The second connecting portion 47 is formed in a tubular shape. A concave portion 53 recessed along the axis A3 of the shaft portion 41 is formed at the second end 46 of the shaft portion 41. The tubular second connecting portion 47 is formed at the second end 46 of the shaft portion 41 by the concave portion 53. The second connecting portion 47 extends along the axis A3 of the shaft portion 41.

Figure 5:
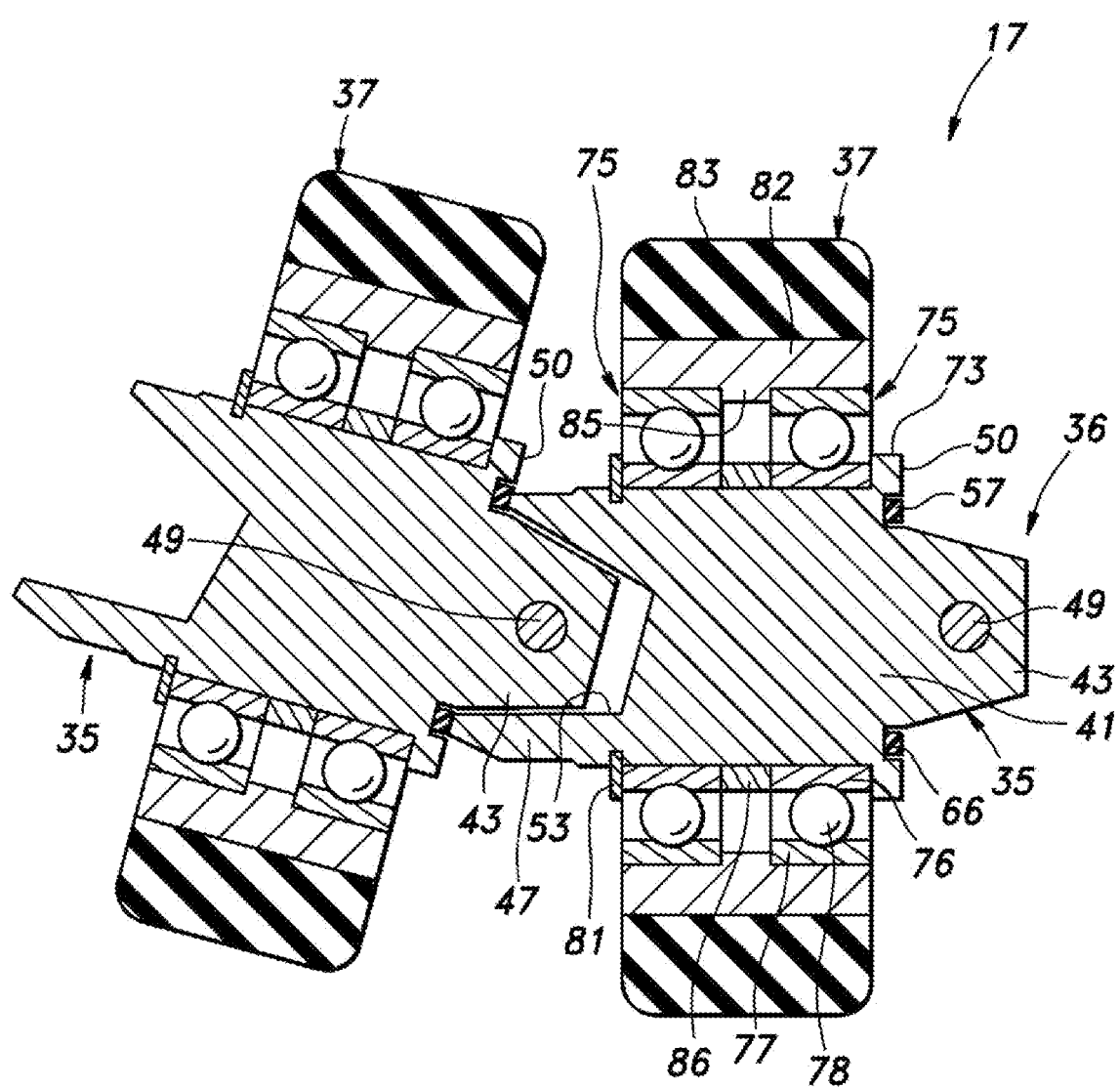
FIG. 5 is a cross-sectional view of the joint member according to the first embodiment.
Figure 6:
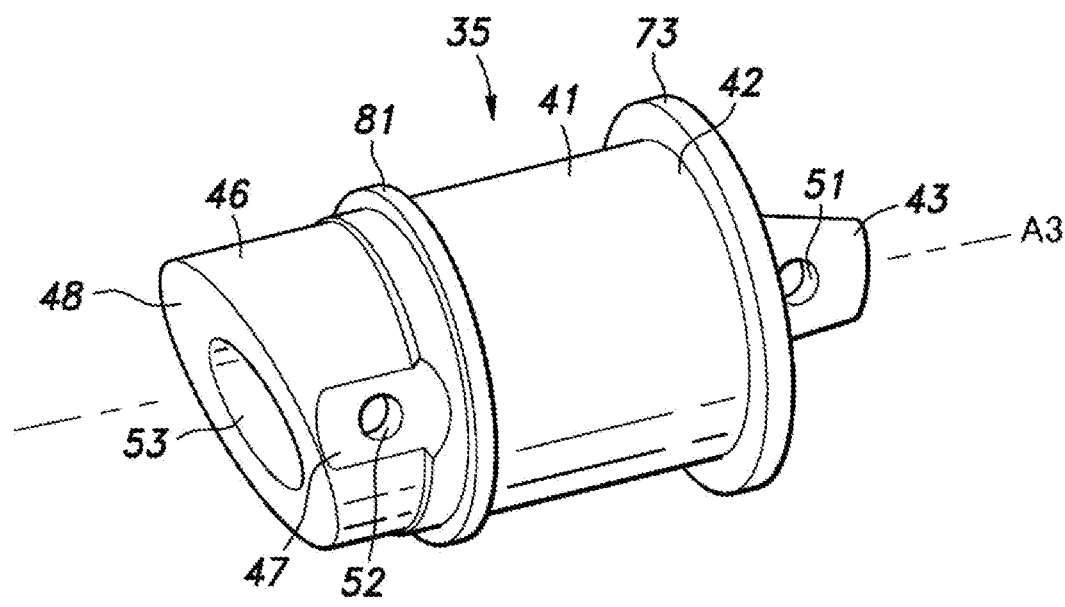
FIG. 6 is a perspective view of the joint member according to the first embodiment.
Figure 7:
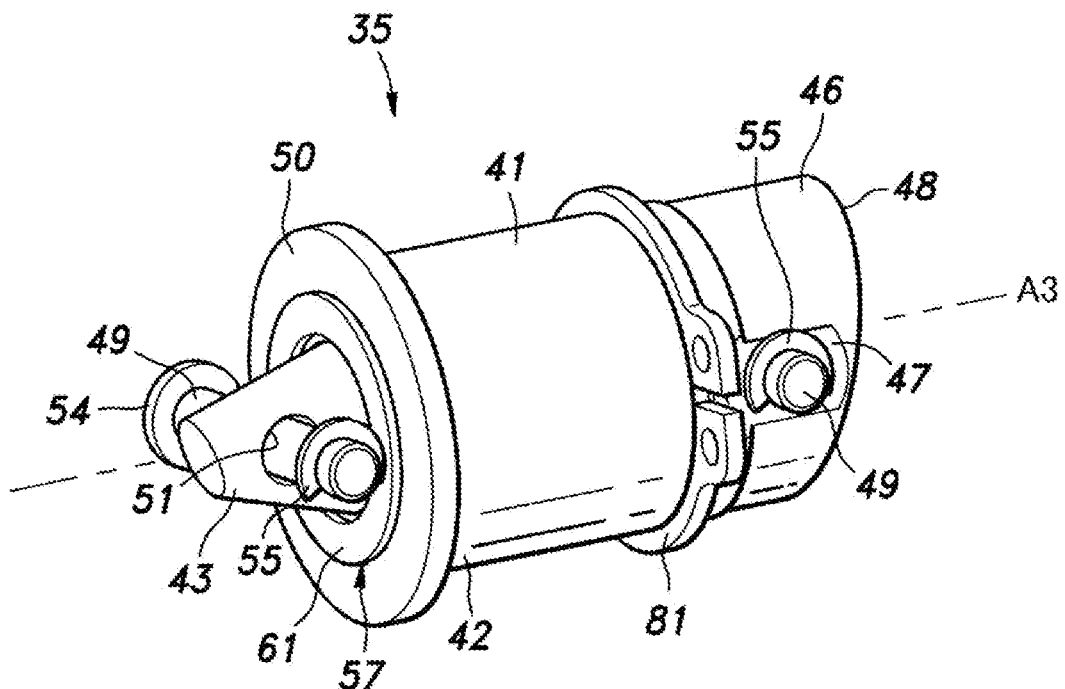
FIG. 7 is a perspective view of the joint member according to the first embodiment.
Figure 8:
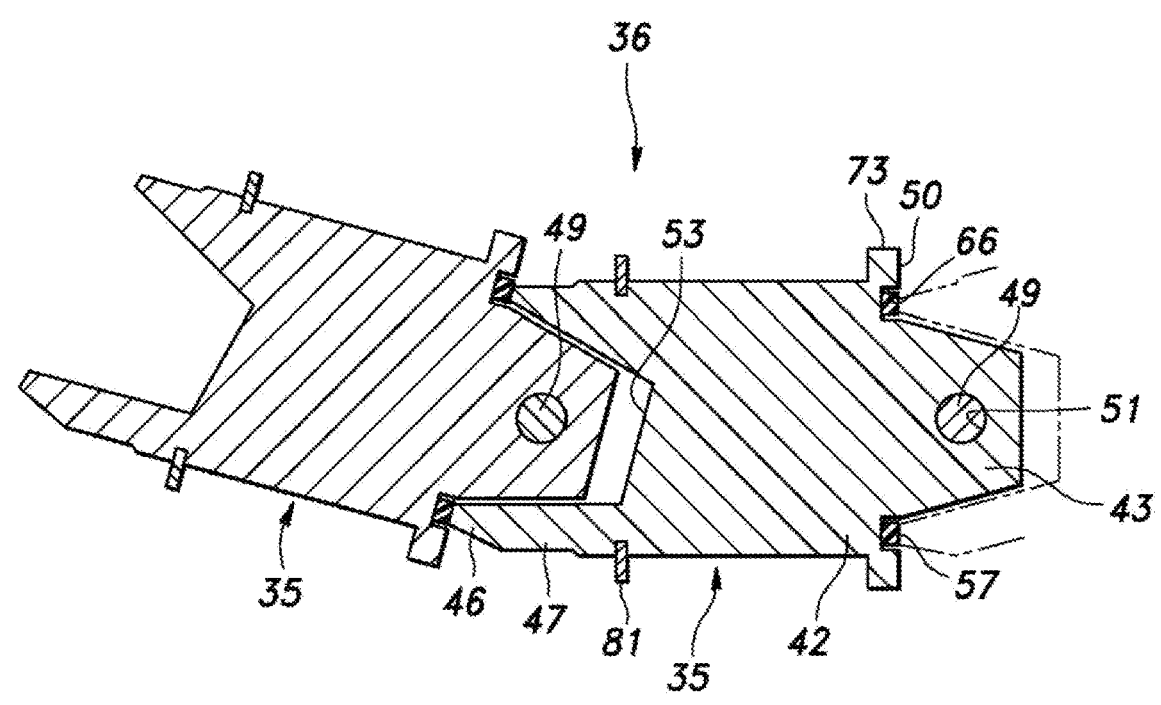
FIG. 8 is a cross-sectional view of the joint member according to the first embodiment.

As shown in FIG. 5 and FIG. 8, the first connecting portion 43 of each of the joint members 35 is inserted into the second connecting portion 47 of the adjacent joint member 35, and is rotatably connected to the second connecting portion 47 by a connecting shaft body 49. The connecting shaft body 49 extends in a direction orthogonal to the axis A3 of the shaft portion 41, and penetrates the second connecting portion 47 and the first connecting portion 43. Through holes 51 and 52 into which the connecting shaft body 49 is inserted are formed in the portions of the first connecting portion 43 and the second connecting portion 47 corresponding to each other. The connecting shaft body 49 has a head portion 54 at the base end, and a snap ring 55 is mounted at the tip end. The head portion 54 and the snap ring 55 are formed in such a size that they cannot pass through the through hole 52 formed in the second connecting portion 47. By mounting the snap ring 55 on the connecting shaft body 49, the connecting shaft body 49 is held by the second connecting portion 47 and the first connecting portion 43. Accordingly, the first connecting portion 43 of each of the joint members 35 is rotatably connected to the second connecting portion 47 of the adjacent joint member 35. The first connecting portion 43 is formed smaller than the concave portion 53, and the first connecting portion 43 can rotate inside the second connecting portion 47. A plurality of connecting shaft bodies 49 are arranged in parallel to one another, and are arranged in parallel to the central axis A1 of the wheel 17.

The first end 42 of each of the joint members 35 abuts on the second end 46 of the adjacent joint member 35 so that the rotation range of the adjacent joint members 35 is restricted. In detail, the first end 42 may abut on the first end surface 50, and the second end 46 may abut on the second end surface 48 which is the end surface of the second connecting portion 47. The first connecting portion 43 and the wall surface of the concave portion 53 may abut on each other so that the rotation range of the adjacent joint members 35 is restricted.

As shown in FIG. 5 and FIG. 7 to FIG. 9, a cushioning material 57 is provided between the first end 42 and the second end 46. The cushioning material 57 is formed of a flexible material. The cushioning material 57 may be formed of vulcanized rubber or a resin-based elastomer. The cushioning material 57 may be provided around the first connecting portion 43 on the first end surface 50. The cushioning material 57 may be formed in an annular shape and arranged around the first connecting portion 43. The cushioning material 57 may be formed in a ring shape having a predetermined thickness. Accordingly, the cushioning material 57 is supported by the first connecting portion 43, and the cushioning material 57 is prevented from falling off from the joint member 35. The cushioning material 57 may have a first surface 61 and a second surface 62 orthogonal to the axis A3 of the shaft portion 41.

An annular receiving groove 66 surrounding the first connecting portion 43 is provided on the first end surface 50.

The cushioning material 57 is arranged in the receiving groove 66. The second surface 62 of the cushioning material 57 may abut on the bottom of the receiving groove 66. The second surface 62 of the cushioning material 57 may be adhered to the bottom of the receiving groove 66. The cushioning material 57 may protrude outward from the receiving groove 66. That is, the first surface 61 forming the main surface of the cushioning material 57 may be arranged outside the first end surface 50. In this case, the cushioning material 57 can be thickened to increase the cushioning effect. Further, the first surface 61 forming the main surface of the cushioning material 57 may be arranged on the same plane as the first end surface 50. In this case, the gap between the first end 42 and the second end 46 can be reduced. Accordingly, it is possible to prevent foreign matter from entering the gap between the first end 42 and the second end 46.

Figure 9:
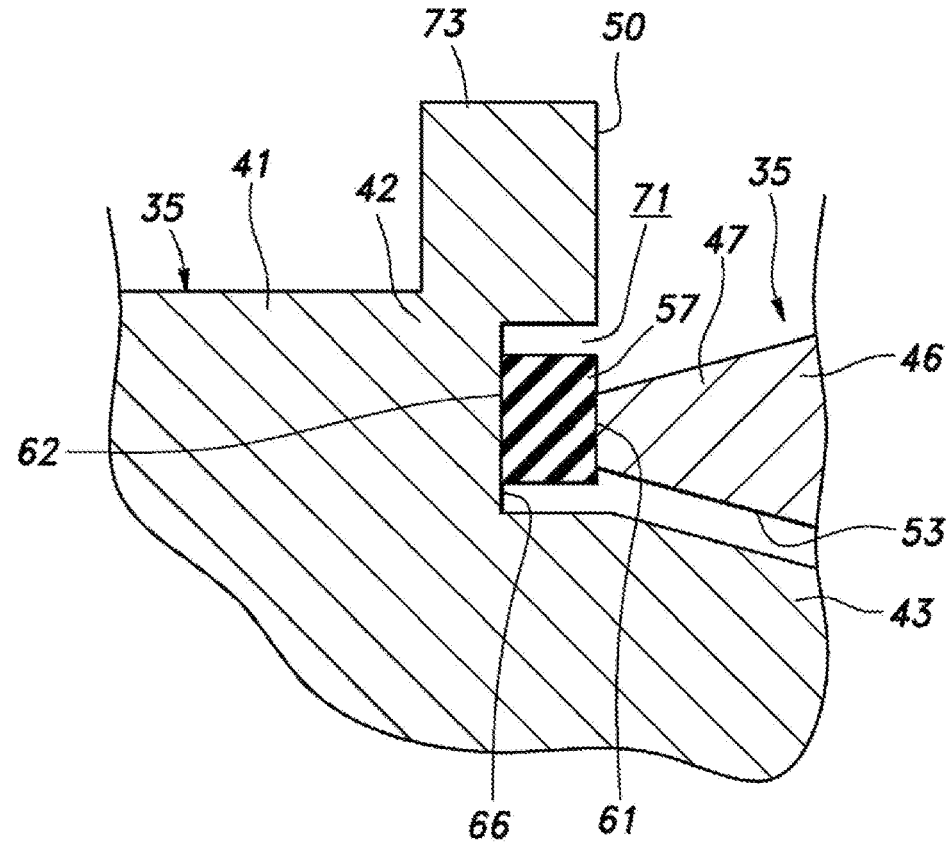
FIG. 9 is an enlarged cross-sectional view of the joint member according to the first embodiment.

As shown in FIG. 9, the width of the receiving groove 66 is formed greater than the width of the cushioning material 57. Accordingly, a gap 71 is formed between the inner peripheral surface of the cushioning material 57 and the inner peripheral wall of the receiving groove 66 and/or between the outer peripheral surface of the cushioning material 57 and the outer peripheral wall of the receiving groove 66. Accordingly, the cushioning material 57 can be deformed in the receiving groove 66. Specifically, when the cushioning material 57 is compressed by the first end 42 and the second end 46, the cushioning material 57 can escape to the gap 71.

The outer diameter of the second end surface 48 of the second connecting portion 47 may be smaller than the outer diameter of the receiving groove 66, and the inner diameter of the second end surface 48 of the second connecting portion 47 may be greater than the inner diameter of the receiving groove 66. With this configuration, the second end surface 48 of the second connecting portion 47 is prevented from directly contacting the first end surface 50.

The second end surface 48 of the second connecting portion 47 may constantly be in contact with the cushioning material 57. In this case, the adjacent joint members 35 can rotate with each other within the range in which the cushioning material 57 can be deformed. In another embodiment, the second end surface 48 of the second connecting portion 47 may be separated from the cushioning material 57 when the adjacent joint members 35 are in a predetermined rotation position.

As shown in FIG. 5 to FIG. 8, a flange portion 73 formed by extending the first end surface 50 in the radial direction is provided at the first end 42. The flange portion 73 may be formed in a circular plate shape. The outer diameter of the flange portion 73 is greater than the outer diameter of the shaft portion 41. The flange portion 73 is arranged outward in the radial direction of the cushioning material 57. That is, the flange portion 73 and the cushioning material 57 are arranged on a plane orthogonal to the axis A3 of the shaft portion 41.

As shown in FIG. 5, the free roller 37 is supported by the shaft portion 41 via a bearing 75 which is a radial bearing. The bearing 75 may be a ball bearing which includes an inner race 76, an outer race 77, a plurality of balls 78 interposed between the inner race 76 and the outer race 77, and a retainer holding the plurality of balls 78. The bearing 75 is positioned by the flange portion 73 and a snap ring 81 mounted on the outer peripheral surface of the shaft portion 41.

As shown in FIG. 5, the free roller 37 includes a sleeve 82 and a rubber ring 83 provided on the outer peripheral surface of the sleeve 82. The sleeve 82 may be formed of metal. The rubber ring 83 may be adhered to the sleeve 82 by vulcanization adhesion or the like. The sleeve 82 is fixed to the outer peripheral surface of the outer race 77 of the bearing 75.

In the present embodiment, the sleeve 82 is rotatably supported by the shaft portion 41 via two bearings 75 arranged in the axial direction. An annular locking convex portion 85 that protrudes inward in the radial direction and extends in the circumferential direction is provided at the central portion of the inner peripheral surface of the sleeve 82. The locking convex portion 85 is sandwiched between the outer races 77 of the two bearings 75. A spacer 86 is arranged between the inner races 76 of the two bearings 75. The two inner races 76 are arranged between the flange portion 73 and the snap ring 81 in the axial direction, and are fixed to the shaft portion 41. In this way, the free roller 37 is rotatably supported by the shaft portion 41 via the bearing 75.

An assembly method of the wheel 17 is as follows. First, two bearings 75, the spacer 86, and the free roller 37 are mounted on the shaft portion 41 of each joint member 35 and fixed by the snap ring 81. Next, the cushioning material 57 is mounted in the receiving groove 66 of each joint member 35. Next, the first connecting portion 43 of each of the joint members 35 is inserted into the second connecting portion 47 of the adjacent joint member 35, and the first connecting portion 43 and the second connecting portion 47 are rotatably connected by the connecting shaft body 49. Accordingly, the annular wheel 17 is formed.

As shown in FIG. 3, the plurality of free rollers 37 are arranged at equal intervals in the circumferential direction of the core body 36. Each free roller 37 is supported by the core body 36 to be rotatable around the axis A2 (annular axis) of the annular core body 36. Each free roller 37 can rotate around the tangent of the core body 36 at each position with respect to the core body 36. Each free roller 37 receives an external force and rotates with respect to the core body 36.

As shown in FIG. 2 and FIG. 3, the wheel 17 is arranged along the outer peripheral portion of the pair of drive disks 16, and is in contact with the plurality of drive rollers 26 provided on each drive disk 16. The drive rollers 26 of each drive disk 16 come into contact with the inner peripheral portion of the wheel 17 and sandwich the wheel 17 from both the left and right sides. Further, as the drive rollers 26 of the left and right drive disks 16 are in contact with the inner peripheral portion of the wheel 17, the displacement in the radial direction around the axis of the drive disks 16 is restricted. Accordingly, the wheel 17 is supported by the left and right drive disks 16, and the central axis A1 of the wheel 17 (core body 36) is arranged substantially coaxially with the axes of the left and right drive disks 16. The wheel 17 is in contact with the plurality of drive rollers 26 of the left and right drive disks 16 in the plurality of free rollers 37.

The plurality of free rollers 37 located at the lower part of the wheel 17 are pushed downward by the plurality of drive rollers 26. Accordingly, the plurality of joint members 35 rotate, and the core body 36 is deformed. Specifically, the wheel 17 is deformed into an elliptical shape in which the long axis extends in the horizontal direction and the short axis extends in the vertical direction. That is, the radius of curvature of the core body 36 at the lower and upper parts of the wheel 17 is greater than the radius of curvature of the core body 36 at the intermediate portion in the vertical direction of the wheel 17. Accordingly, the ground contact area of the plurality of free rollers 37 increases. As a result, the running performance of the omnidirectional moving device 3 is improved.

In each omnidirectional moving device 3, when the pair of drive disks 16 rotate in the same direction at the same rotation speed, the wheel 17 rotates together with the pair of drive disks 16. That is, the wheel 17 rotates forward or rearward around the central axis A1. At this time, the drive rollers 26 of the drive disks 16 and the free rollers 37 of the wheel 17 do not rotate with respect to the core body 36. In each omnidirectional moving device 3, when a difference in rotation speed is generated between the pair of drive disks 16, with respect to the force in the circumferential (tangential) direction caused by the rotation of the pair of drive disks 16, a component force in a direction orthogonal to this force acts on the free rollers 37 of the wheel 17 from the left and right drive rollers 26. Since the axis of the drive roller 26 is inclined with respect to the plane orthogonal to the axis of the drive disk 16, a component force is generated due to the difference in rotation speed between the drive disks 16. Due to this component force, the drive rollers 26 rotate with respect to the base 25, and the free rollers 37 rotate with respect to the core body 36. Accordingly, the wheel 17 generates a driving force in the left-right direction.

The cart 1 moves forward as the left and right omnidirectional moving devices 3 rotate forward at the same speed. The cart 1 moves rearward as the left and right omnidirectional moving devices 3 rotate rearward at the same speed. The cart 1 turns to the right or left due to the speed generated in the rotation of the left and right omnidirectional moving devices 3 in the front-rear direction. The cart 1 moves laterally to the right or left as the free rollers 37 of each wheel 17 of the left and right omnidirectional moving devices 3 rotate.

As shown in FIG. 1, the force sensor 5 is provided between the vehicle body 2 and the handle 4. The control device 6 is an electronic control device (ECU) including a processor such as a CPU, a non-volatile memory (ROM), a volatile memory (RAM), etc. The control device 6 controls the electric motor 18 based on the load and the moment detected by the force sensor 5 by executing arithmetic processing according to the program stored in the non-volatile memory in the processor. Accordingly, when the occupant applies a load and a moment to the handle 4, the omnidirectional moving device 3 is driven and the cart 1 travels.

The effects of the wheel 17 and the omnidirectional moving device 3 according to the present embodiment will be described. Since the cushioning material 57 is arranged between the first end 42 and the second end 46 of the adjacent joint members 35, when the adjacent joint members 35 rotate with each other, the first end 42 and the second end 46 abut on each other via the cushioning material 57. Accordingly, the collision sound caused by the collision between the first end 42 and the second end 46 is suppressed.

In the wheel 17 according to the first embodiment, the cushioning material 57 may be coupled to the second end surface 48 of the second connecting portion 47. Further, the cushioning material 57 may be provided on the wall surface of the concave portion 53 of the second connecting portion 47. In this case, the cushioning material 57 is sandwiched between the outer surface of the first connecting portion 43 and the inner surface of the second connecting portion 47 in the concave portion 53.

Figure 10:
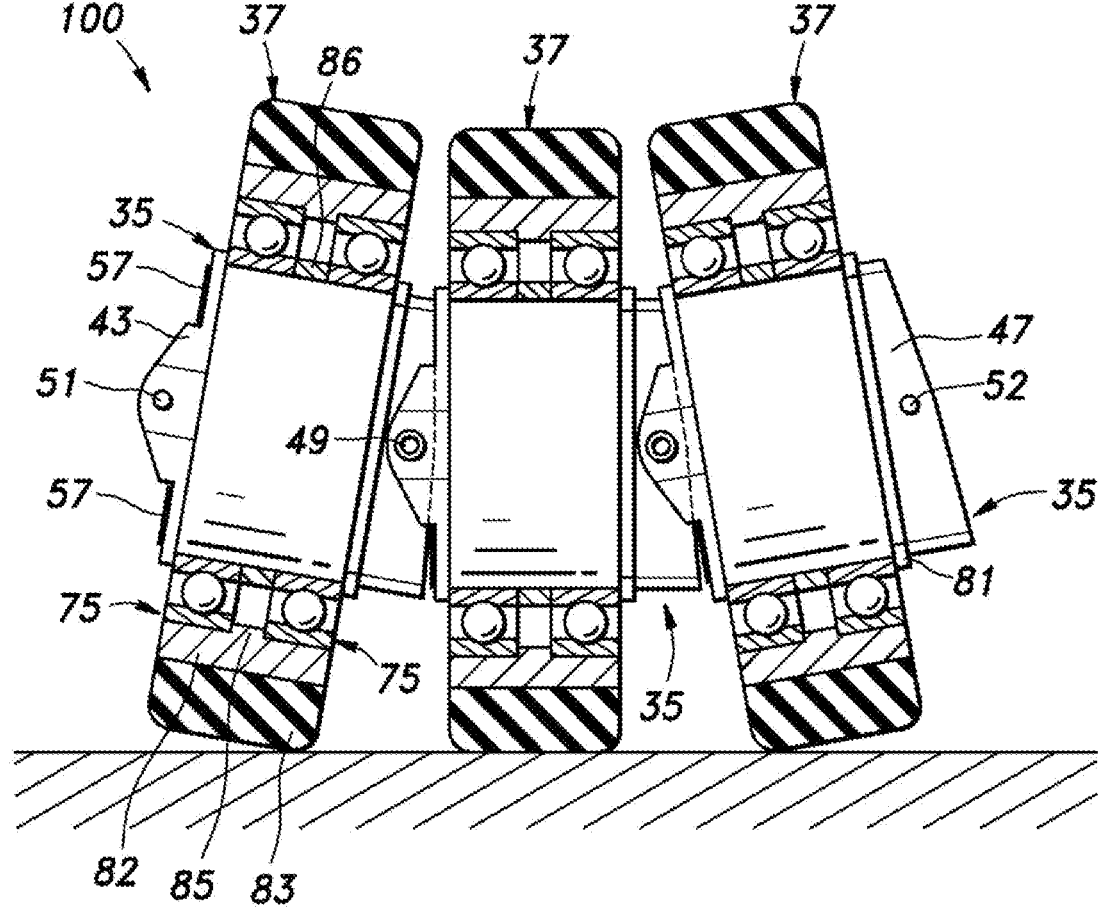
FIG. 10 is a cross-sectional view of the joint member and the free roller according to the second embodiment.
Figure 11:
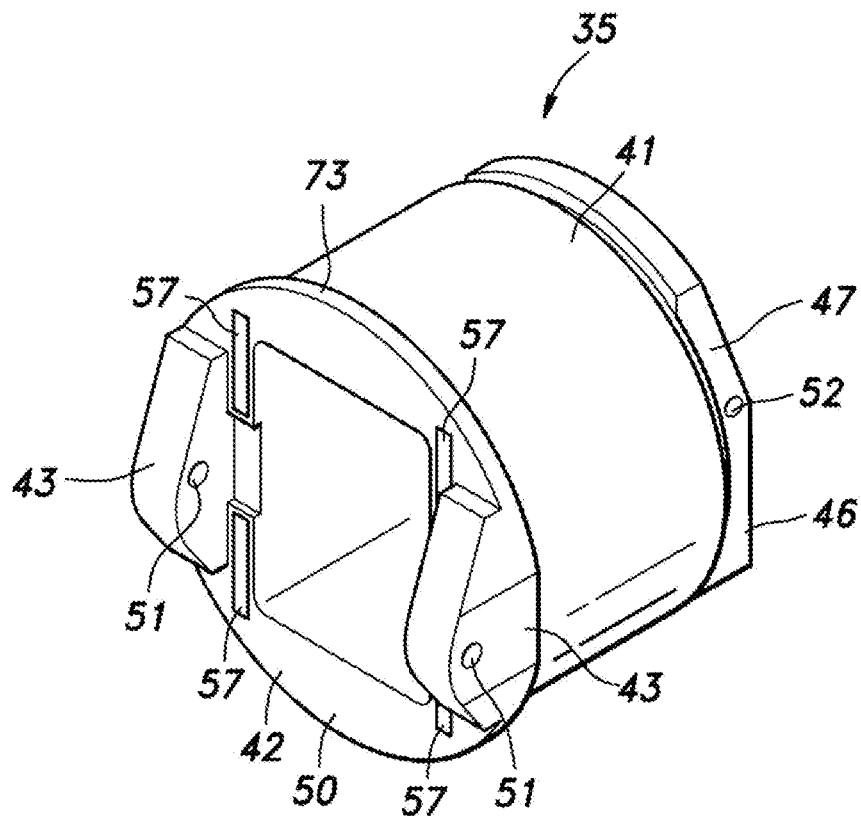
FIG. 11 is a perspective view of the joint member according to the second embodiment.
Figure 12:
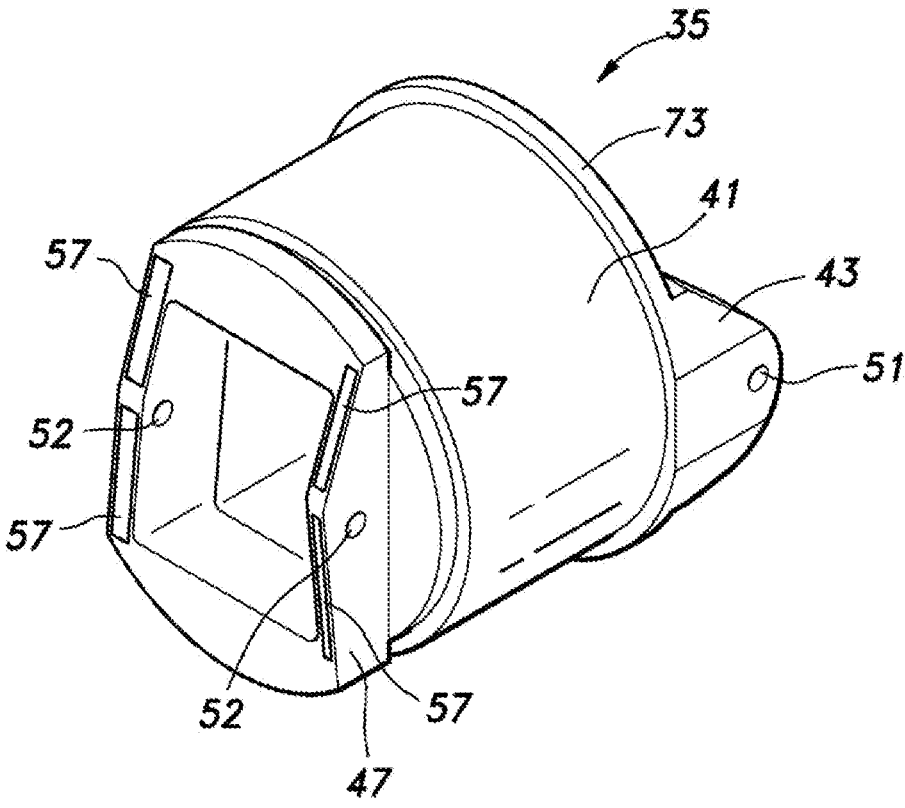
FIG. 12 is a perspective view of the joint member according to the second embodiment.

As shown in FIG. 10 to FIG. 12, a wheel 100 according to the second embodiment is different in the shapes of the joint member 35 and the cushioning material 57 as compared with the wheel 17 according to the first embodiment, and the other configurations are the same.

The first end surface 50 is expanded in the radial direction of the shaft portion 41 by the flange portion 73. The first connecting portion 43 includes a pair of first connecting portions 43 projecting on the first end surface 50. The pair of first connecting portions 43 are arranged at an interval from each other. The pair of first connecting portions 43 are arranged on the outer peripheral portion of the first end surface 50.

The second connecting portion 47 includes a second connecting portion 47 provided at the second end 46. The second connecting portion 47 extends along the axis A3 of the shaft portion 41. The second connecting portion 47 of any joint member 35 is arranged between the pair of first connecting portions 43 of the adjacent joint member 35, and is rotatably connected to the pair of first connecting portions 43 by the connecting shaft body 49.

The second end surface 48 of the second connecting portion 47 is formed in a triangular shape so that the width is narrowed toward the tip end side of the second connecting portion 47 when viewed from the direction along the connecting shaft body 49. The first end surface 50 and the end surface of the second connecting portion 47 abut on each other so that the rotation range of the adjacent joint members 35 is restricted.

The cushioning material 57 may be adhered to at least one of the end surface of the second connecting portion 47 and the first end surface 50. A plurality of cushioning materials 57 may be provided at appropriate positions on the end surface of the second connecting portion 47.

Although the description of the specific embodiments is completed above, the disclosure can be widely modified without being limited to the above embodiments.

What is claimed is:

1. A wheel for an omnidirectional moving device, the wheel comprising:
an annular core body formed by connecting a plurality of joint members into an annular shape; and
a plurality of free rollers rotatably supported by the core body,
wherein each of the joint members comprises a shaft portion having a first end and a second end, a first connecting portion provided at the first end, and a second connecting portion provided at the second end,
each of the plurality of free rollers is rotatably supported by the shaft portion of the corresponding joint member,
the first connecting portion of each of the joint members is rotatably connected to the second connecting portion of the adjacent joint member,
the first end of each of the joint members abuts on the second end of the adjacent joint member so that a rotation range of the adjacent joint members is restricted, and
a cushioning material is provided between the first end of each of the joint members and the second end of the adjacent joint member, and is in direct contact with both the first end and the second end.

2. The wheel according to claim 1, wherein the shaft portion has a first end surface at the first end,
the first connecting portion protrudes from the first end surface,
the second connecting portion is formed in a tubular shape, and
the first connecting portion of each of the joint members is inserted into the second connecting portion of the adjacent joint member, and is rotatably connected to the second connecting portion by a connecting shaft body.

3. The wheel according to claim 2, wherein the cushioning material is formed in an annular shape, and is arranged around the first connecting portion.

4. The wheel according to claim 3, wherein a receiving groove surrounding the first connecting portion is provided on the first end surface, and
the cushioning material is arranged in the receiving groove.

5. The wheel according to claim 4, wherein the cushioning material protrudes outward from the receiving groove.

6. The wheel according to claim 5, wherein a width of the receiving groove is greater than a width of the cushioning material.

7. The wheel according to claim 5, wherein a flange portion extending the first end surface in a radial direction is provided at the first end,
the free roller is supported by the shaft portion via a bearing, and
the bearing is fixed to the shaft portion by the flange portion and a snap ring mounted on an outer peripheral surface of the shaft portion.

8. The wheel according to claim 4, wherein a main surface of the cushioning material is arranged on the same plane as the first end surface.

9. The wheel according to claim 8, wherein a width of the receiving groove is greater than a width of the cushioning material.

10. The wheel according to claim 8, wherein a flange portion extending the first end surface in a radial direction is provided at the first end,
the free roller is supported by the shaft portion via a bearing, and
the bearing is fixed to the shaft portion by the flange portion and a snap ring mounted on an outer peripheral surface of the shaft portion.

11. The wheel according to claim 4, wherein a width of the receiving groove is greater than a width of the cushioning material.

12. The wheel according to claim 11, wherein a flange portion extending the first end surface in a radial direction is provided at the first end,
the free roller is supported by the sorghaft portion via a bearing, and
the bearing is fixed to the shaft portion by the flange portion and a snap ring mounted on an outer peripheral surface of the shaft portion.

13. The wheel according to claim 4, wherein a flange portion extending the first end surface in a radial direction is provided at the first end,
the free roller is supported by the shaft portion via a bearing, and
the bearing is fixed to the shaft portion by the flange portion and a snap ring mounted on an outer peripheral surface of the shaft portion.

14. The wheel according to claim 3, wherein a flange portion extending the first end surface in a radial direction is provided at the first end,
the free roller is supported by the shaft portion via a bearing, and
the bearing is fixed to the shaft portion by the flange portion and a snap ring mounted on an outer peripheral surface of the shaft portion.

15. The wheel according to claim 2, wherein a flange portion extending the first end surface in a radial direction is provided at the first end, the free roller is supported by the shaft portion via a bearing, and the bearing is fixed to the shaft portion by the flange portion and a snap ring mounted on an outer peripheral surface of the shaft portion.

16. An omnidirectional moving device, comprising:

the wheel according to claim 1;

a pair of drive disks rotatably supported by a frame, arranged on both sides of the wheel, and transmitting a driving force to the wheel; and a pair of electric motors respectively rotating the drive disks.

\* \* \* \* \*